(12) United States Patent
Mansri et al.

(10) Patent No.: US 10,020,729 B2
(45) Date of Patent: Jul. 10, 2018

(54) CURRENT-MODE DC/DC CONVERTER AND METHOD THEREFOR

(71) Applicant: NXP USA, Inc., Austin, TX (US)

(72) Inventors: Mohammed Mansri, Toulouse (FR); Philippe Goyhenetche, Fonsorbes (FR)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 15/809,375

(22) Filed: Nov. 10, 2017

(65) Prior Publication Data

US 2018/0152103 A1    May 31, 2018

(30) Foreign Application Priority Data

Nov. 29, 2016  (EP) ..................................... 16306574

(51) Int. Cl.
  *H02M 3/157*  (2006.01)
  *H02M 3/156*  (2006.01)
  *H02M 1/00*   (2006.01)

(52) U.S. Cl.
  CPC ........... *H02M 3/157* (2013.01); *H02M 3/156* (2013.01); *H02M 2001/0009* (2013.01); *H02M 2001/0029* (2013.01)

(58) Field of Classification Search
  CPC ................. H02M 3/157; H02M 3/156; H02M 2001/0029; H02M 2001/0009
  See application file for complete search history.

(56) References Cited

U.S. PATENT DOCUMENTS

| | | | |
|---|---|---|---|
| 5,717,322 A | 2/1998 | Hawkes et al. | |
| 6,498,466 B1 | 12/2002 | Edwards | |
| 7,605,574 B2 * | 10/2009 | Dearn ................... | H02M 3/156 323/282 |
| 8,138,734 B2 * | 3/2012 | Xi .......................... | H02M 3/156 323/224 |
| 9,467,051 B2 * | 10/2016 | Stoichita ............... | H02M 3/158 |

(Continued)

FOREIGN PATENT DOCUMENTS

EP    2299577 A1    3/2011

OTHER PUBLICATIONS

U.S. Appl. No. 14/707,179; not yet published (filed May 8, 2015).

(Continued)

*Primary Examiner* — Kyle J Moody
(74) *Attorney, Agent, or Firm* — Charlene R. Jacobsen

(57) ABSTRACT

A current-mode DC-DC converter includes a power switch and a reset circuit for providing a resettable input signal to the switch. A first feedback loop, coupled to the switch, provides a control signal to the reset circuit to instigate the resettable input signal when a ramp voltage reaches a target peak current value. An inductor is coupled to the switch. A second current control feedback loop includes a current sense circuit that monitors an inductor current influenced by an output of the switch, and a slope compensation circuit for introducing a ramp voltage to a sensed voltage of the switch to control power switch on/off to limit the inductor current. The converter is characterized by a slope compensation effect cancellation circuit coupled to the current sense circuit via the second feedback loop for sensing an inductor peak current and controlling power switch on/off in response to the inductor peak current.

14 Claims, 3 Drawing Sheets

(56) References Cited

U.S. PATENT DOCUMENTS

2007/0252567 A1   11/2007   Dearn et al.
2009/0302820 A1   12/2009   Shimizu et al.
2014/0247029 A1    9/2014   Krabbenborg

OTHER PUBLICATIONS

U.S. Appl. No. 15/616,135; 18 pages; not yet published (filed Jun. 7, 2017).

Zhongjie, Guo et al; "Design and implementation of adaptive slope compensation in current mode DC-DC converter"; 2010 Chinese Institute of Electronics; Journal of Semiconductors, vol. 31, No. 12 (Dec. 2010).

* cited by examiner

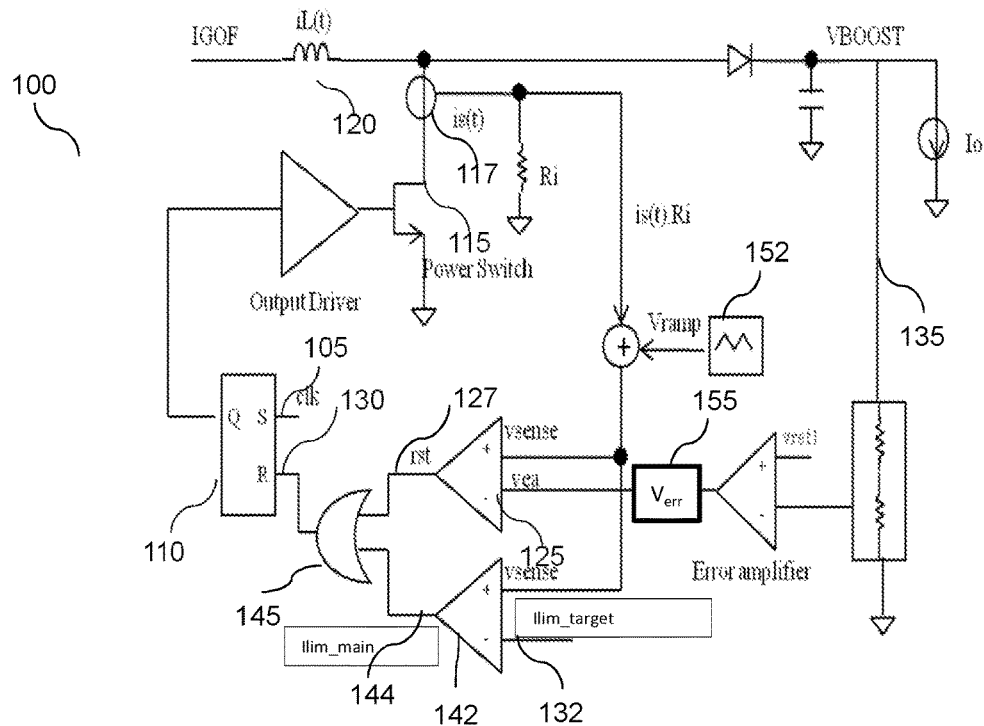
FIG. 1 – Prior Art
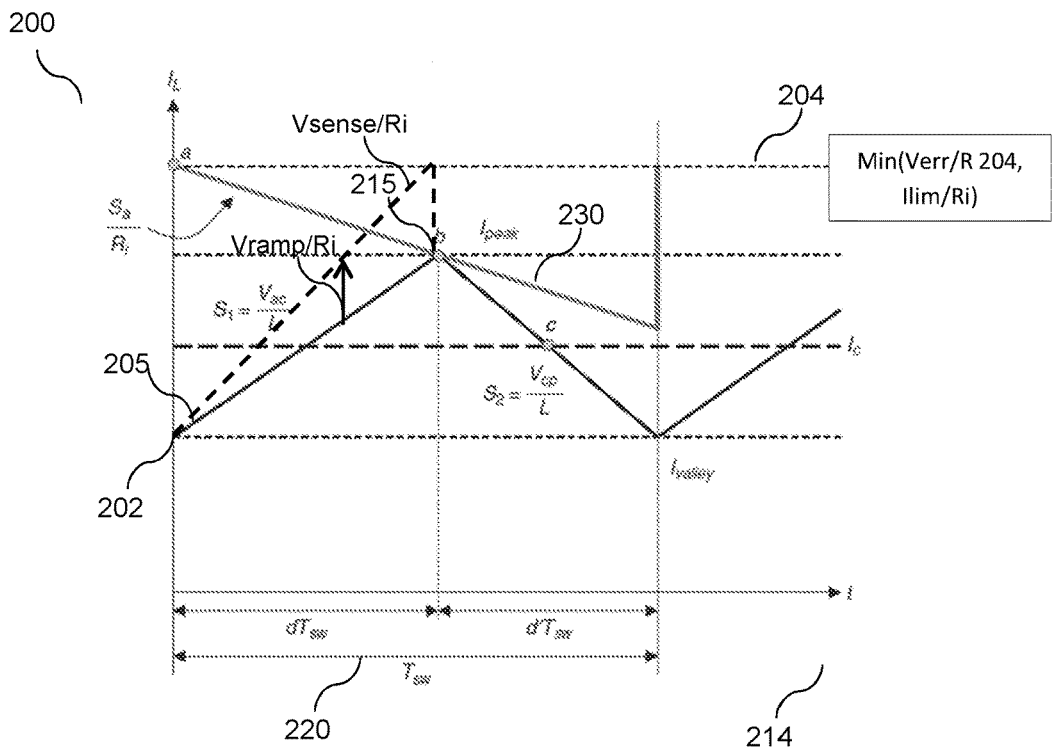
FIG. 2

CURRENT-MODE DC/DC CONVERTER AND METHOD THEREFOR

CROSS-REFERENCE TO RELATED APPLICATIONS

This application claims the priority under 35 U.S.C. § 119 of European patent application no. 16306574.1, filed Nov. 29, 2016 the contents of which are incorporated by reference herein.

FIELD OF THE INVENTION

The field of the invention relates to a current-mode DC-DC converter and a method for cancelling an adverse effect of slope compensation in a DC/DC converter that employs inductor peak current limit regulation.

BACKGROUND OF THE INVENTION

A switched-mode (sometimes referred to as switching-mode) power supply (SMPS) is an electronic power supply that includes a switching regulator to convert electrical power efficiently. In the same manner as other power supplies, an SMPS transfers power from a DC or AC source (often mains power), to DC loads for devices such as a personal computer, whilst converting voltage and current characteristics. Unlike a linear power supply, the pass transistor of a switching-mode supply continually switches between low-dissipation 'full-on' and 'full-off' states, and spends very little time in the high dissipation transitions, in order to minimize wasted energy.

There are two main operational modes that are used to control the behaviour of a SMPS, namely voltage mode and current-mode. Voltage-controlled mode is where the actual output voltage is compared to the desired output voltage and the difference (sometimes referred to as voltage error) is used to adjust a pulse width modulated (pwm) duty cycle in order to control the voltage across an inductor. Recently, current-mode control was developed to correct some known issues with voltage mode. Current-mode uses the error between the desired and actual output voltages to control the peak current through the inductor.

Referring now to FIG. 1, a known current-mode boost (DC-DC) converter circuit 100 is shown. Referring also to FIG. 2, a known current-mode waveform 200 of the boost converter circuit 100 of FIG. 1 is shown.

In the known current-mode boost converter circuit 100, a clock pulse 105 of a clock cycle sets a latch of R-S flip-flop 110, which closes the power switch 115. The current ramps up 205 from a minimum current level 202 in an inductor 120, following a particular current slope shape. When the sensed current 117 reaches a particular (target) value 132, 204, i.e. min(Verr/R, Ilimit/Ri), a first comparator 125 detects it and provides a reset signal 144 to reset the latch 130. The power switch 115 now opens and waits for the next clock cycle 214, in order to close again. A feedback loop 135 controls the peak current set point 215 (Vea), and thereby indirectly the duty cycle 220, and thus generates a current-mode power supply.

The cost of the inductor 120 in a SMPS is related to the inductance value and the maximal rated current. Exceeding a maximal rated current of the SMPS reduces the value of the inductor and causes unexpected, undesirable, behavior. Hence, SMPS designs specify a maximum inductor peak current. In current-mode, for any SMPS duty cycle that is higher than 50%, a slope compensation circuit must be introduced to avoid sub-harmonic oscillations occurring. A slope compensation circuit is applied via Vramp 152 (as slope compensation 230 of FIG. 2) and added to the present voltage (is(t)*Ri). This information is compared in comparator 125 to the output of the error amplifier 155.

However, this slope compensation affects the inductor peak current limit (Ilimit), as the current limitation is reduced according to the duty cycle 220. This modification of the Ilimit value, means a reduction on the output current capability of the SMPS, especially in cases of: low inductor value, high duty cycle and/or in a boost converter application.

However, for a boost converter application, at a high duty cycle, a high current peak is required to have a high load current capability. Hence, cancelling the effect of the slope compensation is a desirable aim.

An 'OR' gate 145 is connected to the two comparators 125 and 142, which provide two alternative options to trigger a reset signal 130 to the R-S flip-flop 110 based on the triggering of a reset signal from comparator 125 or the output comparator 142.

In U.S. Pat. No. 5,717,322, titled 'Method to improve the peak current limit in a slope compensated, current-mode DC/DC converter, and circuit therefore', the Ilimit value is changed cycle after cycle, based on the slope compensation value. Such a solution is difficult and costly to implement, due to a need for a sample and hold circuit.

Thus, there exists a need for a circuit and method that cancels or reduces the slope compensation negative effect on the output current capability of a current controlled SMPS, and preferably prevents, at the same time, the inductor from exceeding the maximal rated current.

SUMMARY OF THE INVENTION

The present invention provides a current-mode DC-DC converter and a method of operation of a current-mode DC-DC converter, for example to cancel or reduce an adverse effect of slope compensation in a DC/DC converter that employs inductor peak current limit regulation, as described in the accompanying claims.

In a first aspect, a current-mode DC-DC converter includes a power switch; a reset circuit configured to provide a resettable input signal to the power switch; and a first feedback loop coupled to the power switch and configured to provide a control signal to the reset circuit to instigate a resettable input signal when a ramp voltage reaches a target peak current value, thereby generating a current-mode power supply from the power switch. The current-mode DC-DC converter also includes an inductor, operably coupled to the power switch; and a second current control feedback loop comprising: a current sense circuit configured to monitor a current passing through the inductor as influenced by an output of the power switch; and a slope compensation circuit operably coupled to the current sense circuit and configured to introduce a ramp voltage to the sensed voltage of the power switch to control a switch on-switch off the power switch to limit the inductor current. A slope compensation effect cancellation circuit is operably coupled to the current sense circuit via the second current control feedback loop and arranged to sense an inductor peak current and additionally control the switch on-switch off of the power switch in response to the sensed inductor peak current in order to limit the inductor current.

In some examples, the slope compensation effect cancellation circuit may control the switch on-switch off of the power switch in response to the sensed inductor peak current to negate the slope compensation circuit affecting a current-mode DC-DC converter current limit (Ilimit) value. In some examples, the slope compensation effect cancellation circuit may be performed each current cycle, based on the sensed inductor peak current, an input current and a determined slope compensation value each cycle.

In some examples, the slope compensation circuit may include a first comparator configured to generate a first power switch reset signal and the the slope compensation effect cancellation circuit comprises a second comparator configured to generate a second power switch reset signal.

In some examples, the slope compensation effect cancellation circuit may be configured to receive the sensed power switch voltage and compare the sensed power switch voltage with a threshold value that is representative of an updated inductor current limit (Ilimit_update) value. In some examples, an auto calibration circuit may be configured to generate the updated inductor current limit (Ilimit_update) value. In some examples, the updated inductor current limit (Ilimit_update) value may be used as a threshold value to trigger the second power switch reset signal (Ilim_slope).

In some examples, the slope compensation effect cancellation circuit may include a third comparator configured to fix a current limitation target of the current-mode DC-DC converter and output a third power switch reset signal (Ilim_main value). In some examples, the third comparator may compare a power switch target voltage (Ilim_target) with a present voltage (Is(t)*R1) measured across a shunt resistance (Ri) that is coupled to the current sense circuit and that is subjected to the sensed current in inductor.

In some examples, the auto calibration circuit may include at least one digital to analog converter (DAC), the DAC being configured to receive a first input of a main current limitation (Ilim_main) output by the third comparator and a second input of the second power switch reset signal (Ilim_slope) output by the second comparator. In some examples, the DAC may be additionally configured to use an over-sampling clock in addition to a DAC clock in order to reach a steady state condition faster. In some examples, the DAC may be configured to either: decrease a reference frequency of a DAC output current updated threshold value (Llim_update) in response to the main current limitation (Ilim_main) being reached, or increase the frequency of the DAC output current updated threshold value (Llim_update) in response to a sensed power switch voltage reaching a threshold value that triggers the second power switch reset signal (Ilim_slope). In some examples, the DAC may maintain the same reference frequency for the DAC output current updated threshold value (Llim_update) in response to both of the main current limitation (Ilim_main) being reached and the sensed power switch voltage reaching a threshold value.

In a second aspect of the invention, a method of operation of a current-mode DC-DC converter comprising a power switch and a reset circuit configured to provide a resettable input signal to the power switch is described. The method comprises: providing a control signal to the reset circuit via a first feedback loop coupled to the power switch to instigate a resettable input signal when a ramp voltage reaches a target peak current value, thereby generating a current-mode power supply from the power switch; monitoring, by a current sense circuit, an inductor current influenced by an output of the power switch to produce a sensed voltage; and applying a slope compensation signal by introducing a ramp voltage to the sensed voltage to control a switching operation of the power switch to limit the inductor current. The method further includes sensing an inductor peak current; and additionally controlling the switching operation of the power switch in response to both the sensed inductor peak current and the slope compensation signal.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

FIG. 1 illustrates a simplified known current-mode boost DC-DC converter circuit.

FIG. 2 illustrates a known current-mode waveform inside an inductor in the current-mode a boost DC-DC converter of FIG. 1.

DETAILED DESCRIPTION

Examples of the present invention find applicability in all DC-DC converters that employ a current-mode control loop and, thus, use slope compensation. For example, embodiments of the invention find applicability in current-controlled SMPS devices.

The present invention relates to a circuit architecture that is configured to cancel the slope compensation negative effect on the output current capability of a current controlled DC-DC converter, e.g. an SMPS, and may prevent, at the same time, the inductor from exceeding the maximal rated current. Examples of the invention propose the addition of a new control loop to the current controlled DC-DC converter, and a slope compensation effect cancellation circuit configured to cancel the effect of the slope compensation on the current limit (Ilimit) value. In some examples, this slope compensation effect cancellation may be performed cycle after cycle, based on the sensed inductor peak current and input current plus slope compensation value each cycle.

Examples of the invention propose determining the real inductor peak current value and using this determined real inductor peak current value together with the slope compensation value to regulate (adapt) the Ilimit value. In this manner, the slope compensation effect on the output current capability of a current controlled DC-DC converter is cancelled without exceeding, for example at any cycle, the inductor maximal rated current. This approach is in contrast to the known current-mode DC-DC converter techniques that propose changing the Ilimit value only based on the slope compensation.

Figure 3:
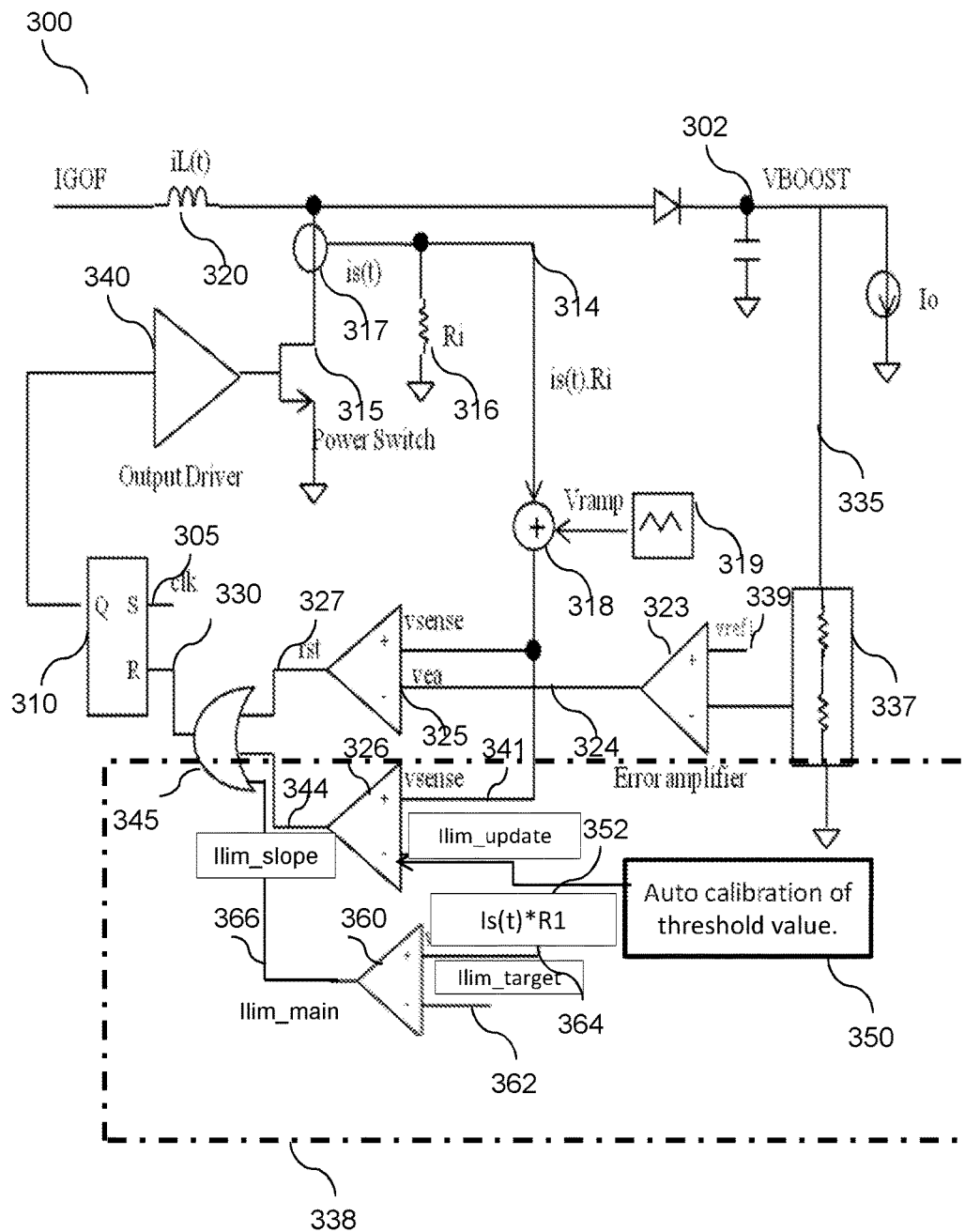
FIG. 3 illustrates a simplified example block diagram of a current-mode DC-DC converter, according to example embodiments of the invention.

Referring now to FIG. 3, a simplified example block diagram of a current-mode DC-DC converter 300 is illustrated, according to example embodiments of the invention.

In the current-mode DC-DC converter 300, an inductor 320 is connected to a boost feedback voltage 302. An error amplifier 323 is coupled to a first feedback path 335 that is connected to the boost feedback voltage 302 (Vboost). The boost feedback voltage 302 is the voltage of a bridge resistor 337 that is connected to the input of the error amplifier 323. The goal is to regulate the feedback to the reference voltage, vref1, 339. The output of the error amplifier 323 is connected to a first comparator 325.

In the current-mode DC-DC converter 300, a clock pulse of a clock cycle 305 sets a latch of R-S flip-flop 310, which closes the power switch 315. The current then ramps up in inductor 320, following a particular current slope shape. The current in inductor 320 is sensed by current sensor in current sense circuit 317 and fed into a second feedback loop that includes feedback path 314, and summed in summing junction 318 with a voltage ramp slope compensation signal 319. The output from the summing junction 318 provides a sensed voltage to both the first comparator 325 and a second comparator 326.

The first comparator 325 compares the sensed voltage to an error voltage output (Vea) from the error amplifier 323 that sets the peak current. In this manner, the first comparator 325 handles the voltage ramp slope compensation signal 319, which inherently reduces output current capability of the DC-DC converter 300, and outputs a first potential reset signal 327 to logic 'OR' gate 345.

In accordance with examples of the invention, the second comparator 326 is used to guarantee a stability of the DC-DC converter at high duty cycles. In this example, the second comparator 326 receives the same sensed power switch voltage information (Vsense) 341 and compares this voltage with an updated threshold value (Llim_update) 352. The updated threshold value (Llim_update) 352 is generated by an auto calibration circuit 350 configured to calculate an auto calibration threshold value. In some examples, the updated threshold value (Llim_update) 352 is dynamically updated by the auto calibration circuit 350 on each clock cycle. In some examples, the auto calibration circuit 350 calculates an auto calibration threshold value using feedback signals (not shown) of the Ilim main value 366 and the Ilim slope value 344.

The second comparator 326 handles the cancellation of the effect of the slope compensation signal and is, thus, able to output a Ilim_slope value 344 as a second (potential) alternative reset signal to logic 'OR' gate 345, which ultimately triggers the reset 330 of the R-S flip-flop 310 instead of first (potential) reset signal 327. Thus, examples of the invention introduce circuit 338 that is configured to provide a cancellation of negative effect of the slope compensation employed for the current limitation.

A third comparator 360 fixes the current limitation target by comparing a Ilim_target voltage value 362 with a present voltage (Is(t)*R1) across a shunt resistance Ri 316 that is subjected to the sensed current in inductor 320. The third comparator 360 outputs a Ilim_main value 366 as a third potential reset signal to logic 'OR' gate 345.

In this manner, the power switch 315 is closed upon the R-S flip-flop 310 being reset via reset latch 330 in response to one of the reset signals being input to logic 'OR' gate 345. An output driver 340 may be included at an input of the power switch 315.

Hence, the reset latch 330 is coupled to the logic 'OR' gate 345, which outputs a reset signal to reset latch 330 upon one of three conditions arising.

A first condition is when the current reaches a particular value, that third comparator 360 detects and applies a reset signal 366 to the logic 'OR' gate 345, which in turn sends a reset signal to the reset latch 330. The power switch 315 now opens and waits for the next clock cycle, in order to close again.

A second condition exists with the slope compensation on the current limit when the current-mode duty cycle is higher than 50%. Here, a slope compensation circuit applies a slope compensation signal via Vramp 319 to limit the excess duty cycle and avoid sub-harmonic oscillations occurring. The slope compensation circuit adds slope compensation to the present voltage (is(t)*Ri), which is compared in first comparator 325 to the output of the error amplifier 323. This triggers the first comparator 325 that applies a reset signal 327 to the logic 'OR' gate 345, which in turn sends a reset signal to the reset latch 330. The power switch 315 now opens and waits for the next clock cycle, in response to the slope compensation signal reset signal 327. In this second condition, a feedback loop 335 controls the peak current point, and thereby indirectly the duty cycle, and thus generates a current-mode power supply.

In accordance with examples of the invention, a third condition is provided with a new (additional) control loop being added to the DC-DC converter in order to cancel the effect of the slope compensation on the current limit (Ilimit) value. In some examples, this may be implemented for each current cycle, based on the sensed inductor peak current and input current plus slope compensation value each cycle. In this example, second comparator 326 receives the same sensed power switch voltage information (Vsense) 341 as the first comparator 325, but notably compares this voltage with an updated threshold value (Llim_update) 352 that is generated by an auto calibration circuit 350 configured. In this manner, the real inductor peak current value is used, in order to regulate the Ilimit value, together with the slope compensation value. This triggers the third comparator 326 that applies a reset signal 344 to the logic 'OR' gate 345, which in turn sends a reset signal to the reset latch 330. The power switch 315 now opens and waits for the next clock cycle.

Thus, in this manner, the output current capability is improved without exceeding, in any cycle, the inductor (L) 320 maximal rated current.

Advantageously, in some examples, for a given output current capability requirement, a smaller inductance may be used when employing the concepts herein described, in contrast to a classic current controlled DC/DC. Here, with an increase in slope compensation, there is a consequent increase in the current saturation requirement of the inductance, L. Such an increase in current saturation requires an increase in the inductance size. However, in accordance with example embodiments, the peak inductance current can now be calibrated and used, and, thus, a lower value (and therefore size) of the inductance may be selected.

Examples of the invention further enable an inductor with a smaller peak current to be used, as a duty cycle margin is no longer required. Hence, the cost of the inductor 320 in a SMPS is reduced, as it is related to the inductance value and the maximal rated current.

Furthermore, and advantageously in examples of the invention, by avoiding the maximal rated current of the inductor 320 and SMPS/DC-DC converter being exceeded, no unexpected, undesirable, behaviour may be observed.

Figure 4:
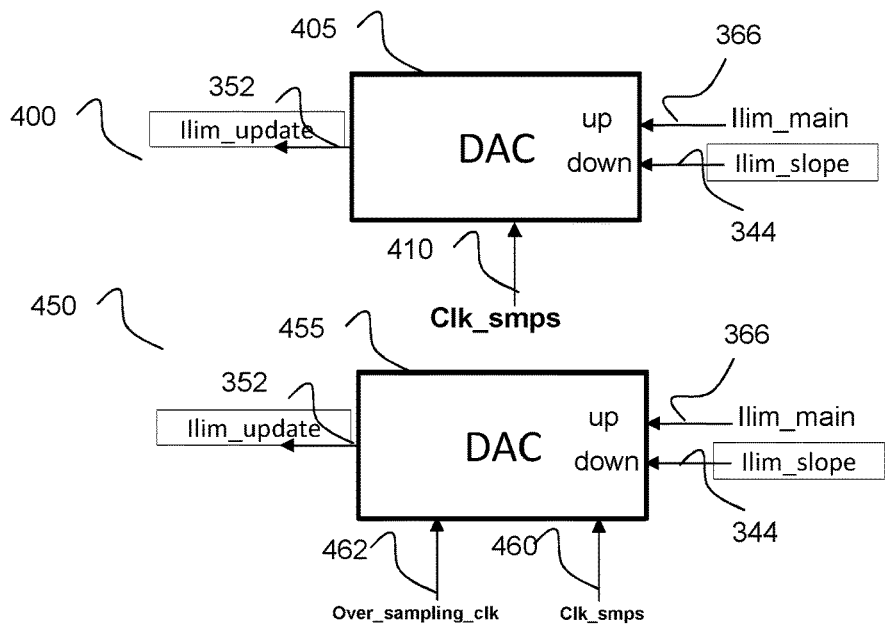
FIG. 4 illustrates simplified example implementations to generate an auto calibration threshold value, according to example embodiments of the invention.

Referring now to FIG. 4, simplified example arrangements to perform an auto calibration of a threshold value, such as auto calibration circuit 350 of FIG. 3 in order to determine a current limitation to use, are illustrated according to example embodiments of the invention.

A first example arrangement 400 employs a digital to analog converter (DAC) 405 using the same clock 410 of the SMPS DC-DC converter (e.g. clock pulse 305 of FIG. 3) to reach the steady state condition, in case of current limitation. If the main current limitation (Ilim_main) value 366 is reached (or flagged), the DAC 405 decreases a threshold value (Llim_update) 352 for the next cycle of the SMPS clock (Clk_smps) 410. If the secondary current limitation (Ilim_slope) value 344 is reached (or flagged), the DAC 405 increases the DAC reference frequency for the current limitation for the next cycle of the SMPS. If both of the flags are reached the DAC 405 keeps the same DAC reference frequency for the current limitation threshold value.

A second example arrangement 450 also employs a digital to analog converter (DAC) 455 where an over-sampling clock (over_sampling_clk) 462 is used as the frequency clock for the DAC 455. This frequency must be higher than the main clock of the SMPS (clk_smps) 460. The resolution of the compensation is a function of the ratio between the over_sampling_clk 462 and clk_smps 460. If the main current limitation (Ilim_main) value 366 is reached (or flagged), the DAC 455 decreases the DAC reference frequency for the current limitation for the next rising edge of the high frequency clock (clk_hf) until the Ilim_slope is reached. If the secondary current limitation (Ilim_slope) value 344 is reached (or flagged), the DAC 455 increases the DAC reference frequency for the current limitation for the next cycle of the SMPS. If both of the flags are reached the DAC keep the same DAC reference frequency for the current limitation threshold value.

Figure 5:
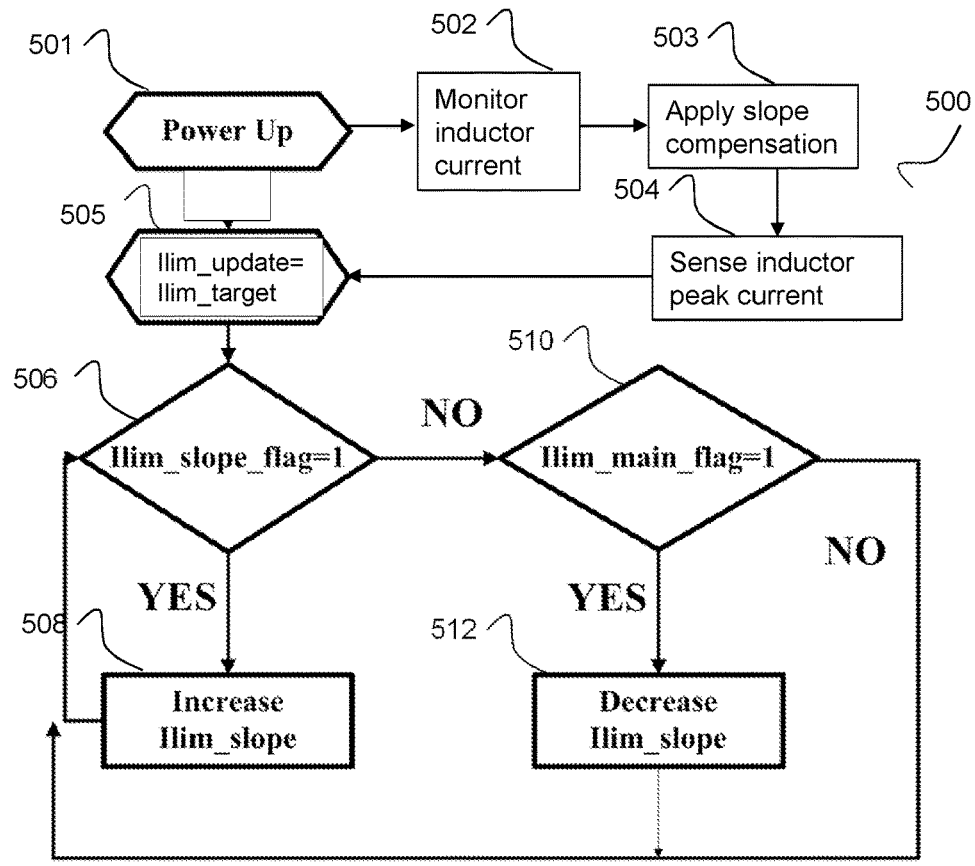
FIG. 5 illustrates an example flow chart for cancelling an adverse effect of slope compensation in a DC/DC converter that employs inductor peak current limit regulation, according to example embodiments of the invention.

Referring now to FIG. 5, an example flow chart 500 illustrates a method for cancelling an adverse effect of slope compensation in a DC-DC converter that employs inductor peak current limit regulation, according to example embodiments of the invention. In essence, FIG. 5 shows one example mechanism that provides a 'cycle race' between the output signal (the current limit of the slope value 344) of the second comparator 326 and the output signal (main current limit value 366) of the third comparator 360 of FIG. 3.

The flowchart 500 starts at 501 with the DC-DC converter powering up. Here, the DC-DC converter provides a control signal to the reset circuit (for example components 345, 330, 310 of FIG. 3), thereby generating a current-mode power supply from a power switch. At 502, an inductor current influenced by an output of the power switch (315) is monitored by a current sense circuit to produce a sensed voltage. At 503, a slope compensation signal is applied by introducing a ramp voltage to the sensed voltage to control a switching operation of the power switch to limit the inductor current. At 504, an inductor peak current is sensed.

At 505, the threshold value (Llim_update) (for example threshold value 352 of FIG. 3) is set to be equal to the Ilim_target voltage value (for example voltage value 362 of FIG. 3). The flowchart then moves to 506, where a determination is made as to whether a current limit of the slope value (or flag) 344 is set to '1'. If the current limit of the slope value (or flag) 344 is set to '1' in 506, the current limit of the slope is increased in 508 and the flowchart loops to 506, for as long as the current limit of the slope value (or flag) 344 is set by second comparator 326 of FIG. 2. If the current limit of the slope flag is not set to '1' in 506, a determination of the main current limit value (or flag) 366 is made as to whether the main current limit flag is set to '1' in 510. If the main current limit value (or flag) 366 is set to '1' in 510, the current limit of the slope value (or flag) 344 is decreased in 512 and the flowchart loops to 506, for as long as the slope flag is set. If the main current limit flag is not set to '1' in 510, the flowchart loops to 506. In this manner, an auto calibration of a threshold value, such as auto calibration circuit 350 of FIG. 3 additionally controls the switching operation of the power switch in response to both the sensed inductor peak current and the slope compensation signal 344, thereby reducing or removing a negative effect of the slope compensation signal according to example embodiments of the invention.

In some examples, the circuits herein described may be implemented using discrete components and circuits, whereas in other examples the circuit may be formed in integrated form in an integrated circuit. Because the illustrated embodiments of the present invention may, for the most part, be implemented using electronic components and circuits known to those skilled in the art, details will not be explained in any greater extent than that considered necessary as illustrated below, for the understanding and appreciation of the underlying concepts of the present invention and in order not to obfuscate or distract from the teachings of the present invention.

A skilled artisan will appreciate that the level of integration of processor circuits or components may be, in some instances, implementation-dependent. Furthermore, a single processor or MCU may be used to implement processing of current control loop comprising a slope compensation circuit configured to identify a maximum inductor current (e.g. Ilim_value) to control a switch on-switch off of a power switch in order to limit the inductor current.

In the foregoing specification, the invention has been described with reference to specific examples of embodiments of the invention. It will, however, be evident that various modifications and changes may be made therein without departing from the scope of the invention as set forth in the appended claims and that the claims are not limited to the specific examples described above.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Those skilled in the art will recognize that the architectures depicted herein are merely exemplary, and that in fact many other architectures can be implemented which achieve the same functionality.

Any arrangement of components to achieve the same functionality is effectively 'associated' such that the desired functionality is achieved. Hence, any two components herein combined to achieve a particular functionality can be seen as 'associated with' each other such that the desired functionality is achieved, irrespective of architectures or intermediary components. Likewise, any two components so associated can also be viewed as being 'operably connected,' or 'operably coupled,' to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the circuit and/or component examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired sampling error and compensation by operating in accordance with suitable program code, such as minicomputers, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms 'a' or 'an', as used herein, are defined as one, or more than one. Also, the use of introductory phrases such as 'at least one' and 'one or more' in the claims should not be construed to imply that the introduction of another claim element by the indefinite articles 'a' or 'an' limits any particular claim containing such introduced claim element to inventions containing only one such element, even when the same claim includes the introductory phrases 'one or more' or 'at least one' and indefinite articles such as 'a' or 'an'. The same holds true for the use of definite articles. Unless stated otherwise, terms such as 'first' and 'second' and 'third' are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A current-mode DC-DC converter comprising:
   a power switch;
   a reset circuit configured to provide a resettable input signal to the power switch;
   a first feedback loop coupled to the power switch and configured to provide a control signal to the reset circuit to instigate a resettable input signal when a ramp voltage reaches a target peak current value, thereby generating a current-mode power supply from the power switch;
   an inductor, operably coupled to the power switch;
   a second current control feedback loop comprising:
      a current sense circuit configured to monitor a current passing through the inductor as influenced by an output of the power switch; and
      a slope compensation circuit operably coupled to the current sense circuit and configured to introduce a ramp voltage to a sensed voltage of the power switch to control a switch on-switch off the power switch to limit the inductor current;
   wherein the current-mode DC-DC converter is characterized by:
      a slope compensation effect cancellation circuit operably coupled to the current sense circuit via the second current control feedback loop and arranged to sense an inductor peak current and additionally control the switch on-switch off of the power switch in response to the sensed inductor peak current in order to limit the inductor current.

2. The current-mode DC-DC converter of claim 1 wherein the slope compensation effect cancellation circuit controls the switch on-switch off of the power switch in response to the sensed inductor peak current to negate the slope compensation circuit affecting a current-mode DC-DC converter current limit value.

3. The current-mode DC-DC converter of claim 2 wherein the slope compensation effect cancellation circuit is performed each current cycle, based on the sensed inductor peak current, an input current and a determined slope compensation value each cycle.

4. The current-mode DC-DC converter of claim 1 wherein the slope compensation circuit comprises a first comparator configured to generate a first power switch reset signal and the slope compensation effect cancellation circuit comprises a second comparator configured to generate a second power switch reset signal.

5. The current-mode DC-DC converter of claim 1 wherein the slope compensation effect cancellation circuit is configured to receive the sensed power switch voltage and compare the sensed power switch voltage with a threshold value that is representative of an updated inductor current limit value.

6. The current-mode DC-DC converter of claim 5 further comprising an auto calibration circuit configured to generate the updated inductor current limit value.

7. The current-mode DC-DC converter of claim 6 wherein the updated inductor current limit value is used as a threshold value to trigger the second power switch reset signal.

8. The current-mode DC-DC converter claim 1 wherein the slope compensation effect cancellation circuit comprises a third comparator configured to fix a current limitation target of the current-mode DC-DC converter and output a third power switch reset signal.

9. The current-mode DC-DC converter of claim 8 wherein the third comparator compares a power switch target voltage with a present voltage measured across a shunt resistance that is coupled to the current sense circuit and that is subjected to the sensed current in inductor.

10. The current-mode DC-DC converter of claim 6 wherein the auto calibration circuit comprises at least one digital to analog converter, DAC, the DAC being configured to receive a first input of a main current limitation output by the third comparator and a second input of the second power switch reset signal output by the second comparator.

11. The current-mode DC-DC converter of claim 10 wherein the DAC is additionally configured to use an over-sampling clock in addition to a DAC clock in order to reach a steady state condition faster.

12. The current-mode DC-DC converter of claim 10 wherein the DAC is configured to either: decrease a reference frequency of a DAC output current updated threshold value in response to the main current limitation being reached, or increase the frequency of the DAC output current updated threshold value in response to a sensed power switch voltage reaching a threshold value that triggers the second power switch reset signal.

13. The DC-DC converter of claim 12 wherein the DAC maintains the same reference frequency for the DAC output current updated threshold value in response to both of the main current limitation being reached and the sensed power switch voltage reaching a threshold value.

14. A method of operation of a current-mode DC-DC converter comprising a power switch and a reset circuit configured to provide a resettable input signal to the power switch, the method comprising:

providing a control signal to the reset circuit via a first feedback loop coupled to the power switch to instigate a resettable input signal when a ramp voltage reaches a target peak current value, thereby generating a current-mode power supply from the power switch;

monitoring, by a current sense circuit, an inductor current influenced by an output of the power switch to produce a sensed voltage;

applying a slope compensation signal by introducing a ramp voltage to the sensed voltage to control a switching operation of the power switch to limit the inductor current;

wherein the method is characterized by:

sensing an inductor peak current; and additionally controlling the switching operation of the power switch in response to both the sensed inductor peak current and the slope compensation signal.

\* \* \* \* \*